US008648018B2

United States Patent
Moradi-Araghi et al.

(10) Patent No.: US 8,648,018 B2
(45) Date of Patent: Feb. 11, 2014

(54) CROSSLINKED SWELLABLE POLYMER

(75) Inventors: Ahmad Moradi-Araghi, Bixby, OK (US); David R. Zornes, Bartlesville, OK (US); Riley B. Needham, Bartlesville, OK (US); James H. Hedges, Bartlesville, OK (US); Everett L. Johnston, Welch, OK (US); Faye L. Scully, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 719 days.

(21) Appl. No.: 12/722,344

(22) Filed: Mar. 11, 2010

(65) Prior Publication Data
US 2010/0234252 A1    Sep. 16, 2010

Related U.S. Application Data
(60) Provisional application No. 61/159,486, filed on Mar. 12, 2009.

(51) Int. Cl.
*C09K 8/528* (2006.01)
*C09K 8/68* (2006.01)
*C08L 33/26* (2006.01)

(52) U.S. Cl.
USPC ........... 507/225; 507/219; 507/220; 507/221; 507/224; 524/555

(58) Field of Classification Search
None
See application file for complete search history.

(56) References Cited

U.S. PATENT DOCUMENTS

| | | | | |
|---|---|---|---|---|
| 5,268,116 | A | * | 12/1993 | Fusiak et al. ............... 252/70 |
| 5,399,269 | A | | 3/1995 | Moradi-Araghi |
| 5,423,380 | A | | 6/1995 | Johnston et al. |
| 5,480,933 | A | | 1/1996 | Fox et al. |
| 5,973,042 | A | * | 10/1999 | Yoshinaga et al. ........... 524/192 |
| 6,454,003 | B1 | | 9/2002 | Chang et al. |
| 6,630,429 | B1 | * | 10/2003 | Cremeans et al. ........... 507/104 |
| 6,729,402 | B2 | | 5/2004 | Chang et al. |
| 6,984,705 | B2 | | 1/2006 | Chang et al. |
| 7,300,973 | B2 | | 11/2007 | Chang et al. |

FOREIGN PATENT DOCUMENTS

WO    2007126318    11/2007

* cited by examiner

Primary Examiner — John J Figueroa
(74) Attorney, Agent, or Firm — Boulware & Valoir

(57) ABSTRACT

The invention is directed to stable crosslinked water-soluble swellable polymers, methods for making same, and their various uses in the hygiene and medical arts, gel electrophoresis, packaging, agriculture, the cable industry, information technology, in the food industry, papermaking, use as flocculation aids, and the like. More particularly, the invention relates to a composition comprising expandable polymeric microparticles having labile crosslinkers and stable crosslinkers, said microparticle mixed with a fluid and an unreacted tertiary crosslinker that is capable of further crosslinking the microparticle on degradation of the labile crosslinker so as to form a stable gel. A particularly important use is as an injection fluid in petroleum production, where the expandable polymeric particles are injected into a well and when the heat and/or pH of the well cause degradation of the labile crosslinker and when the particle expands, the tertiary crosslinker crosslinks the polymer to form a stable gel, thus diverting water to lower permeability regions and improving oil recovery.

18 Claims, 9 Drawing Sheets

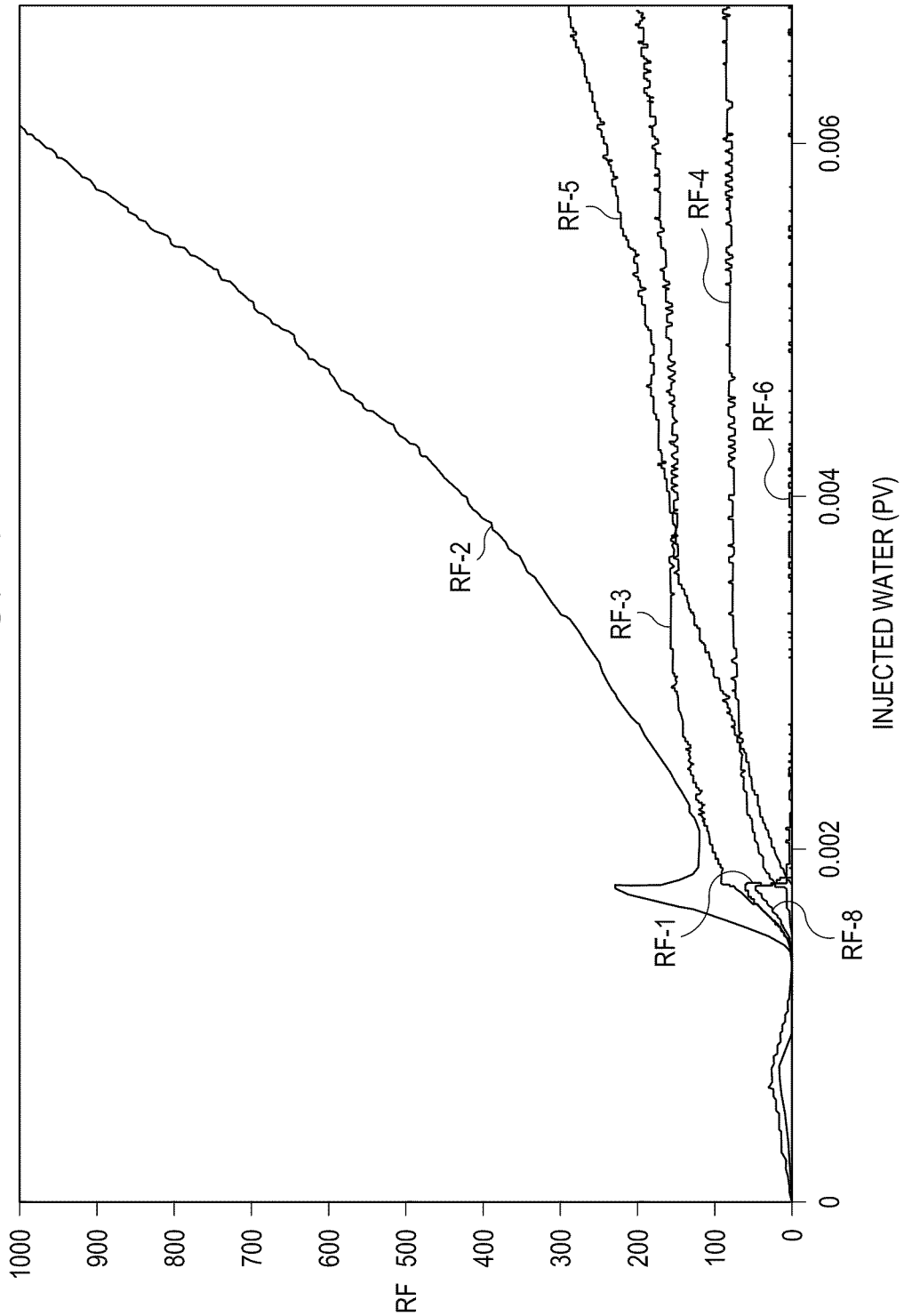

CROSSLINKED SWELLABLE POLYMER

CROSS-REFERENCE TO RELATED APPLICATIONS

This application claims priority to Ser. No. 61/159,486, filed Mar. 12, 2009, and incorporated herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to stable crosslinked swellable polymers, methods for making same, and their various uses in the hygiene and medical arts, gel electrophoresis, packaging, agriculture, the cable industry, information technology, in the food industry, papermaking, use as flocculation aids, and the like. A particularly important use is as drilling fluid in petroleum production, especially in enhanced oil recovery (EOR) applications.

BACKGROUND OF THE INVENTION

A "smart gel" is a material that gels in response to a specific physical property. For example, it may gel at a specific temperature or pressure. Although finding many industrial uses, our interest in smart gels lies in their uses in oil and gas exploration, and in particular as a sweep fluid to improve oil recovery from reservoirs.

The water injection method used in oil production is where water is injected back into the reservoir usually to increase pressure and thereby stimulate production. Water is injected for two reasons: 1. For pressure support of the reservoir (also known as voidage replacement). 2. To sweep or displace the oil from the reservoir, and push it towards an oil production well.

Normally only 30% of the oil in a reservoir can be extracted, but water injection increases that percentage (known as the recovery factor) and maintains the production rate of a reservoir over a longer period of time.

However, sweep recovery is limited by the so-called "thief zones," whereby water preferentially travels through the more porous regions of the reservoirs, bypassing less porous zones. One means of further improving recover is to block thief zones with a polymer or other material, thus forcing water through the less porous regions.

Gels are often used in drilling applications, because these fluids can be optimized for each reservoir by controlling the gelation process. For example, U.S. Pat. No. 5,399,269 describes a composition and method to delay the gelation and increase gel strength, comprising: (1) a water dispersible first crosslinking compound selected from the group consisting of p-aminosalicylic acid, furfuryl alcohol, RArOC(O)R' and HOArC(O)OR" wherein Ar represents a phenyl group which can be substituted or non-substituted; R is a hydrogen or a carboxylic group; R' is a C1-C6 alkyl; R" is a hydrogen, a phenyl group, or a C1-C6 alkyl; and when R is a carboxylic group, R and C(O)OR" can be at ortho, meta, or para position with respect to the OC(O)R' group and the OH group, respectively; (2) a water dispersible second crosslinking compound selected from the group consisting of aldehydes and aldehyde-generating compounds; (3) a water soluble acrylamide-containing polymer; and (4) water.

U.S. Pat. No. 5,480,933, in contrast, describes a composition and method for accelerating the gelation, comprising: (1) an ammonium ion donor; (2) a water soluble acrylamide-containing polymer; (3) a first crosslinking component selected from the group consisting of aldehydes and aldehyde-generating compounds; (4) a second crosslinking component selected from the group consisting of an aromatic compound and an alcohol where the aromatic compound is selected from the group consisting of phenols and acids; and (4) water.

U.S. Pat. No. 5,423,380 describes a process for treating a subterranean formation by adding a crosslinking agent intermittently to a stream of gellable polymer. This method allows a reduction in the total quantity of crosslinking agents needed, a desirable end since many crosslinkers are expensive.

U.S. Pat. No. 6,454,003 et seq, in particular describes what might be called a "smart gel" since its properties change in response to particular stimuli. This patent describes an expandable cross linked polymeric microparticle having an average particle diameter of about 0.05 to 10 microns. The particle is highly crosslinked with two crosslinkers, one that is stable and a second that is labile. The excess crosslinking makes the initial dry particles quite small, allowing efficient propagation through the pores of a reservoir. On heating to reservoir temperature and/or at a predetermined pH or other stimuli, the reversible (labile) internal crosslinks break, allowing the particle to further expand by absorbing additional injection fluid, usually water.

The unique properties of this particle allows it to fill the high permeability zones—commonly called thief zones or streaks—and then be expanded so that the swollen particle blocks the thief zones and subsequent injections of fluid are forced to enter the remainder of the reservoir, more effectively sweeping the reservoir. However, the method is limited in practice because subsequent injections always remove some of the polymer, thus the thief zones become washed out and again present the problem of allowing the injection fluid to avoid entering the less porous zones.

The reason for the washout is not certain, but probably relates to several factors. First, most swellable polymers are also squeezable under pressure. Thus, when the reservoir pressure increases on further injection of fluid, the swollen particle are squeezed, losing fluid and shrinking in size, and thus allowing the particle to wash out of the thief zone. Further, our own research suggests that the swollen polymer is not in gel form, thus although viscous, is a liquid and can be washed out of the porous substrate.

WO2007126318 teaches the use of polymers prepared in an oil-in-oil emulsion. The patent describes the use of an oil soluble monomer polymerized in such emulsion and crosslinked with a permanent as well as a water-labile crosslinker. The resulting crosslinked particles are kept water-free and injected in an organic solvent into the formation, typically producing wells. Once the polymer comes in contact with formation water it swells due to hydrolysis of the labile bonds. The resulting swelled polymers should block water flow and possibly increase oil production.

However, the feasibility of producing such polymers as described in this patent is questionable. According to this patent, the monomers should be oil soluble and at least two oil-soluble crosslinkers are needed to form such particles in which one of these crosslinkers should be water-labile. However, many of the monomers listed are water-soluble and would most likely not dissolve in an oil-in-oil emulsion to carry out the polymerization reaction. Further, the process is only employed in producing wells, not in injection wells.

What is needed in the art is a more stable "smart gel" that is gel stabilized and less susceptible to loss of fluid or polymer under the conditions of use. In particular, a swellable polymer that is resistant to wash out by subsequent fluid injections is needed, but the polymers will have utility in any application where stable swellable smart gels are desired.

SUMMARY OF THE INVENTION

The invention generally relates to smart gels that have stable and labile crosslinkers, allowing swelling in situ in response to a particular stimulus. Further, the swelled polymer is stabilized by further crosslinking, thus forming a gel structure. In preferred embodiments, the amide groups of the fully hydrated polyacrylamide are crosslinked with phenol and formaldehyde to form a three dimensional gel network. Laboratory experiments performed with swellable polymers also containing 1000 ppm each of phenol and formaldehyde resulted in the formation of a stable gel which could not be washed out, even with pressures of up to 1000 psi.

The polymer of the invention has particular use in enhanced oil recovery, as described above, and is preferably a hydrophilic polymer for this application. However, a stable polymer would find uses in all of the arts where swellable polymers are in current use and fluid loss is not desired, including as filler for diapers and other hygiene products, medical devices such as orthopedic insoles, ocular devices, and biomimetic implants, wipe and spill control agents, wire and cable water-blocking agents, ice shipping packs, controlled drug release, agricultural uses (e.g., soil additive to conserve water, plant root coating to increase water availability, and seed coating to increase germination rates), industrial thickeners, specialty packaging, tack reduction for natural rubber, fine coal dewatering, and the like.

Preferably, the stable smart gels of the invention comprise a highly crosslinked expandable polymeric particles having labile crosslinkers and stable crosslinkers, plus a tertiary crosslinker that is added to the particles after they are made or after the labile crosslinker degrades or any time therebetween. In the example described below the tertiary crosslinker is injected after swelling of the polymer, but it can also be combined with the unexpanded kernel in the initial injection fluid, and if necessary for the application, the rate of gelation can be delayed by means known in the art in order to allow the particle to fully swell before completing gelation.

A "stable crosslinker" is defined herein to be any crosslinker that is not degraded under the stimulus that causes the labile crosslinker to disintegrate. Representative non-labile cross linking monomers include methylene bisacrylamide, diallylamine, triallylamine, divinyl sulfone, diethyleneglycol diallyl ether, and the like and combinations thereof. A preferred non-labile cross linking monomer is methylene bisacrylamide.

The "labile crosslinker" is defined herein to be any crosslinker that decays or is reversible on application of a particular stimulus, such as irradiation, pH, temperature, etc. and combinations thereof. Representative labile crosslinkers include diacrylamides and methacrylamides of diamines such as the diacrylamide of piperazine, acrylate or methacrylate esters of di, tri, tetrahydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isbutyric acid) and the vinyl or allyl esters of di or tri functional acids, and combinations thereof. Preferred labile cross linking monomers include water soluble diacrylates such as PEG 200 diacrylate and PEG 400 diacrylate and polyfunctional vinyl derivatives of a polyalcohol such as ethoxylated (9-20) trimethylol triacrylate and polymethyleneglycol diacrylate.

Combinations of multiple stable and labile crosslinkers can also be employed advantageously. Reaction to stimuli can also be controlled by labile crosslinker selection, as needed for particular reservoir conditions or for the application at issue. For example, judicious selection of labile crosslinkers—one that degrades at a very high temperature and another at a lower temperature—can effect the temperature and pH at which the kernel pops.

The "tertiary crosslinker" is defined herein to be any crosslinker that can be activated once the labile crosslinkers are degraded. A particularly useful tertiary crosslinker for reservoir sweeping is phenol and formaldehyde, because the gels produced by this crosslinker are tolerant to the harsh conditions common to deeper reservoirs. However, there are many phenolic substitutes that can be used in the tertiary crosslinker, including phenyl acetate, aspirin, furfurylalcohol, salicyl alcohol, resorcinol, and formaldehyde can be substituted by hexamethylenetetramine. Further, other tertiary crosslinkers may be available, including the crosslinkers listed above, depending on what available reaction groups are present in the swelled polymer, and the needs of the particular application.

Other crosslinkers include, but are not limited to, diacrylyl tertiary amides, diacrylylpiperazine, DATD (diallyltartardiamide), DHEBA (dihydroxyethylene-bis-acrylamide), and BAC (bis-acrylylcystamine), trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and trimethylolpropane triacrylate (TMPTA). Multifunctional crosslinkers include, but are not limited to, pentaerythritol triacrylate, 1,5 pentane diol dimethacrylate, and pentaerythritol triallylether.

When employed for enhanced oil recovery applications, the size range of the unexpanded particle will be selected to accord with the permeability characteristics of a given reservoir and increasing crosslinker provides smaller particles. Thus, the size is preferably about 0.05 to about 10 microns, or 1-3 microns, but the size can vary according to the needs of each application. Ranges as broad as 0.01 to about 100 microns, or sizes as high as 1000 microns can be acceptable. Further, in certain soil and spillage applications, the size can be up to a cm, though more preferably may be 1-5 mm. Generally speaking, the smaller particles will swell more quickly due to increased surface area.

The proportion of stable to labile crosslinker can also vary depending on how much swelling on stimulus is required, but in the enhanced oil recovery applications a great deal of swelling is desired to effectively block the thief zones and increase the mobilization and/or recovery rate of hydrocarbon fluids present in the formations. Thus, the labile crosslinker greatly exceeds the stable crosslinker. To obtain sizes in the range of about 0.05 to about 10 microns suitable for injection fluid use the crosslinker content is about 9,000-200,000 ppm of labile crosslinker and from 0-300 ppm of non-labile cross linkers.

Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

Representative anionic monomers that can be used include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, and the like. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

Representative cationic monomers include the quaternary or acid salts of dialkylaminoalkyl acrylates and methacrylates such as dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyldimethyl ammonium chloride is more preferred.

Representative betaine monomers (a net neutral mix of cationic and anionic monomers) include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, and the like. A preferred betaine monomer is N,N-dimethyl-N-methacryloyloxyethyl-N-(3-sulfopropyl)-ammonium betaine.

Representative swellable polymers also include polymers and copolymers of acrylamide and 2-acrylamido-2-methyl propane sulfonic acid, copolymers of acrylamide and sodium acrylate, terpolymers of acrylamide, 2-acrylamido-2-methyl propane sulfonic acid and sodium acrylate and homopolymers of 2-acrylamido-2-methyl propane sulfonic acid, poly (2-hydroxyethyl methacrylate), poly(2-hydroxypropyl methacrylate), poly(isobutylene-co-maleicacid), and the like.

The kernels can be prepared by methods known in the art, including the inverse emulsion polymerization technique described in U.S. Pat. Nos. 6,454,003, 6,729,402 and 6,984,705. Kernel suspensions are prepared by mixing the tertiary crosslinker with the kernels and injection fluid.

In addition to the monomers and three types of crosslinkers, the aqueous solution may also contain other conventional additives including chelating agents to remove polymerization inhibitors, pH adjusters, initiators and other conventional additives, accelerators, retardants, as appropriate for the particular application.

The rate of gelation with the tertiary crosslinker can be controlled, as is known in the art. Thus, temperature and pH can affect the rate of gelation, as needed for a particular application. In addition, the gels can be destroyed with the use of strong oxidizing agents such as sodium hypochlorite.

In one embodiment the invention is composition comprising a fluid, an unreacted tertiary crosslinker and an expandable polymeric particles having labile crosslinkers and stable crosslinkers. In another embodiment, the invention is a composition comprising expandable polymeric particles having labile crosslinkers and stable crosslinkers, said particle combined with a fluid and an unreacted tertiary crosslinker that is capable of further crosslinking the particle on degradation of the labile crosslinker so as to form a stable gel.

In another embodiment, the invention is a composition comprising highly cross linked expandable polymeric microparticles having an unexpanded volume average particle size diameter of from about 0.05 to about 10 microns and a cross linking agent content of from about 9,000 to about 200,000 ppm of labile crosslinkers and from 0 to about 300 ppm of stable cross linkers, combined with an unreacted tertiary crosslinker and a fluid.

In another embodiment, the invention is a method of increasing the recovery of hydrocarbon fluids in a subterranean formation comprising injecting into the subterranean formation a composition comprising a fluid, an unreacted tertiary crosslinker, and a highly cross linked expandable polymer particle, wherein polymer particle has an unexpanded volume average particle size diameter of 0.05-10 microns and a crosslinker content of about 9,000-200,000 ppm of labile crosslinker and about 0-300 ppm of stable crosslinker, said polymer particle has a smaller diameter than the pores of the subterranean formation, and said labile crosslinkers break under the conditions of temperature and pH in the subterranean formation to allow the polymer particle to expand and said tertiary crosslinker then reacts with said polymer to form a stable gel.

In preferred embodiments, the polymeric microparticles can be a copolymer of acrylamide and sodium 2-acrylamido-2-methylpropane sulfonate, the stable crosslinker can be methylene bisacrylamide, and the labile crosslinker can be a polyethlene glycol diacrylate. The tertiary crosslinker is selected from a combination of phenol, phenyl acetate, aspirin, furfurylalcohol, salicyl alcohol, or resorcinol and formaldehyde or hexamethylenetetramine. However, many other polymers and crosslinkers can be employed, as described herein.

BRIEF DESCRIPTION OF THE DRAWINGS

FIG. 10. RF versus PV Water Injection after Treatment of Slim Tube #3 with 0.5 PV of 0.5% Fresh EC 9368A Polymer and 1000 ppm each of Phenol and Formaldehyde and aging for 3 days at 150° F. and 13.9 days at 190° F. before measuring RF at 150° F.

DESCRIPTION OF EMBODIMENTS OF THE INVENTION

Figure 1:
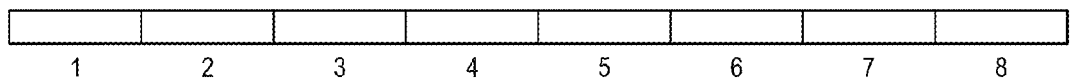
FIG. 1. Schematic diagram showing eight 5-feet sections of the slim tubes before coiling, used in porous media testing.

The invention provides a novel polymer that swells on a stimulus and is then additionally crosslinked to form a gel. Such smart gels have particular utility in sweeping reservoirs, but many uses are possible.

Extensive experiments performed with an expandable polymer, as described in U.S. Pat. Nos. 6,454,003, 6,729,402 and 6,984,705, demonstrated that this polymer swells as a result of aging at elevated temperature or exposure to acidic or caustic conditions. The copolymer of acrylamide and sodium AMPS is cross linked with two crosslinkers. The first crosslinker is a stable crosslinker such as methylene bis-acrylamide in the range of 0-300 ppm, while the second crosslinker is a labile (unstable) compound such as PEG-200, a diacrylate crosslinker that breaks down when exposed to high temperatures or changes in pH. The resulting doubly-crosslinked polymer results in small particle size, ranging at 0.05 to 10 microns.

Such polymers exhibit very low viscosity when suspended in water, a desirable property that improves injectivity, for treating high permeability zones in oil bearing formations. These low viscosity (water-like) micro-particle solutions are injected into the thief zones of the reservoirs with very little pressure requirement for penetration. If the reservoir temperature is high enough, the labile crosslinker undergoes hydrolysis and break down allowing the micro-particle or "kernel" to expand or "pop," thus increasing the viscosity of the solution. The resulting "popped" polymer diverts the subsequent water injection away from the thief zones into lower permeability oil zones to produce additional oil.

Experiments performed with these micro-particles injected into 40' slim tubes packed with sand showed impressive resistance factors in all eight 5' sections of the slim tubes after aging at elevated temperatures (150-190° F.). However, our research also indicated that resistance to flow of water gradually diminished with additional water injection indicating polymer wash-out in porous media—a highly undesirable property.

We therefore undertook to prevent wash-out of expandable polymers, and surprisingly discovered that when phenol and formaldehyde were combined with the above polymers, the resulting gel remained stable to washout!

The function of phenol and formaldehyde in this application is not proven, but probably uses a mechanism similar to the following: The unswelled micro-particles contain a copolymer of acrylamide and sodium AMPS, which is doubly crosslinked with methylene bis-acrylamide as a permanent crosslinker and PEG-200 or PEG-400 diacrylate, as a labile or unstable crosslinkers. These micro-particles are in a ball form and cannot be further crosslinked since the functional groups are hidden in these micro-particles.

After the polymer reaches the target zone in the reservoir, the unstable internal crosslinkers PEG-200 or PEG-400 diacrylates hydrolyze and the particle then opens up (swells, pops). Such popped particles behave as a typical polymer exhibiting good viscosities, but they are not gels. The addition of the tertiary crosslinker crosslinks the now accessible amide groups and results in a stable gel.

We ran a number of slim tube tests in which we injected about 1 pore volume of micro-particles into the sand pack. The sand pack was then heated to allow the polymer to pop. Afterwards, water was injected into the sand packs and the resistance to the flow of water measured. While the popped polymers initially exhibited good resistance factors, this behavior appeared to washout with additional water injection. Typically within one pore volume of water injection the Residual Resistance Factor (RRF) dropped to a number about 1-2. This behavior was observed with slim tubes which were packed with 6.7 Darcy sand as well as 1 Darcy sand. Therefore, the treatment effects of porous media with these micro-particles was only temporary.

In order to improve this performance we co-injected an "external" or "tertiary" crosslinking system, in this instance composed of phenol and formaldehyde. On the addition of heat or change in pH, the labile crosslinkers degraded, the micro-particles swelled and the newly accessible amide groups were then crosslinked with phenol and formaldehyde to form a three dimensional gel network that did not wash out of the sandpack. Indeed, a sand pack treated with popped micro-particles and the tertiary phenol-formaldehyde crosslinking system exhibited no flow even after applying over a thousand psi of pressure. Possible crosslinking mechanisms for phenol and formaldehyde are illustrated below:

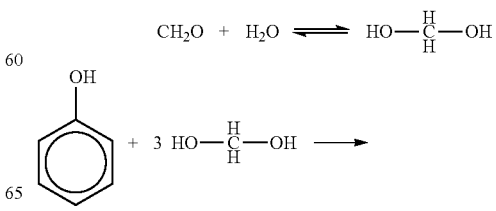

-continued

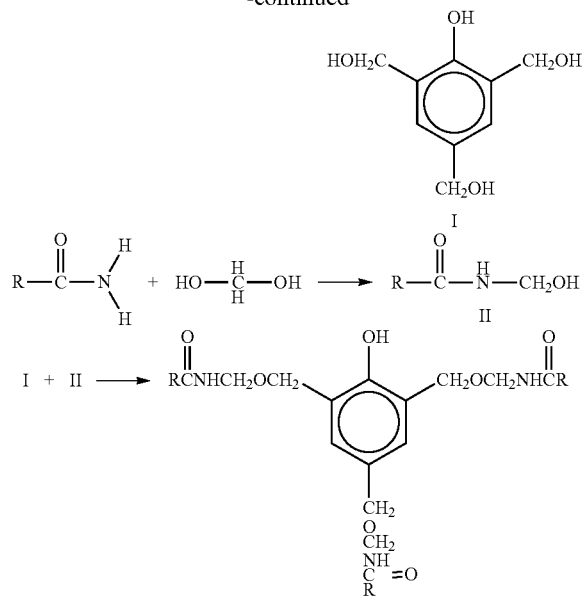

In summary, stable gels that cannot be washed out of porous media are formed by the additional crosslinking of phenol and formaldehyde to a micro-particle copolymer of acrylamide and sodium AMPS (2-acrylamido-2-methylpropane sulfonate), the latter copolymer having been over-crosslinked with methylene bisacrylamide and diacrylates PEG-200 or PEG-400. Other substitutes such as hexamethylene tetramine can be used in place of formaldehyde, and phenyl acetate, aspirin, furfurylalcohol, salicyl alcohol, etc. can be used in place of phenol to produce these stable gels.

EXAMPLE 2

Evaluation of BRIGHTWATER® Polymers

Three slim tube tests were performed to determine the performance of BRIGHTWATER® ® polymers in porous media. The first slim tube test was a proof of concept test and the results are not reported here.

Porous Media Testing of BRIGHTWATER® EC 9368A: Performance of BRIGHTWATER® EC 9368A in porous media was tested in 40' long slim tubes. Each tube was composed of eight 5' long stainless steel tubing with internal diameter (i.d.)=⅜. The sections were filled with sand before connecting each to a pressure tap and assembling them together and forming a coil from them for ease of handling. FIG. 1 shows a schematic diagram of the slim tube prior to coiling. The coil was then placed in an oven set to a desired temperature. Flow rates and differential pressure measurements were monitored by a LabVIEW data acquisition system throughout the experiment.

Each test required three Isco 500D syringe pumps. One pump was used to maintain a back pressure of 100 psi on the slim tube. The second pump was used for water injection, and the third pump was used for polymer injection. These pumps were programmed to inject or withdraw at a given flow rate while monitoring the pressure.

The test was initiated by water injection at constant flow rates to determine permeability in each section of the core. About 1-2 pore volume (PV) polymer solution was then injected into the slim tube at constant flow rate followed by a small amount of water injection to clear the lines from polymer. Simultaneously 6 ampoules containing the polymer solution were placed in the same oven to monitor the progress of popping process.

Figure 2:
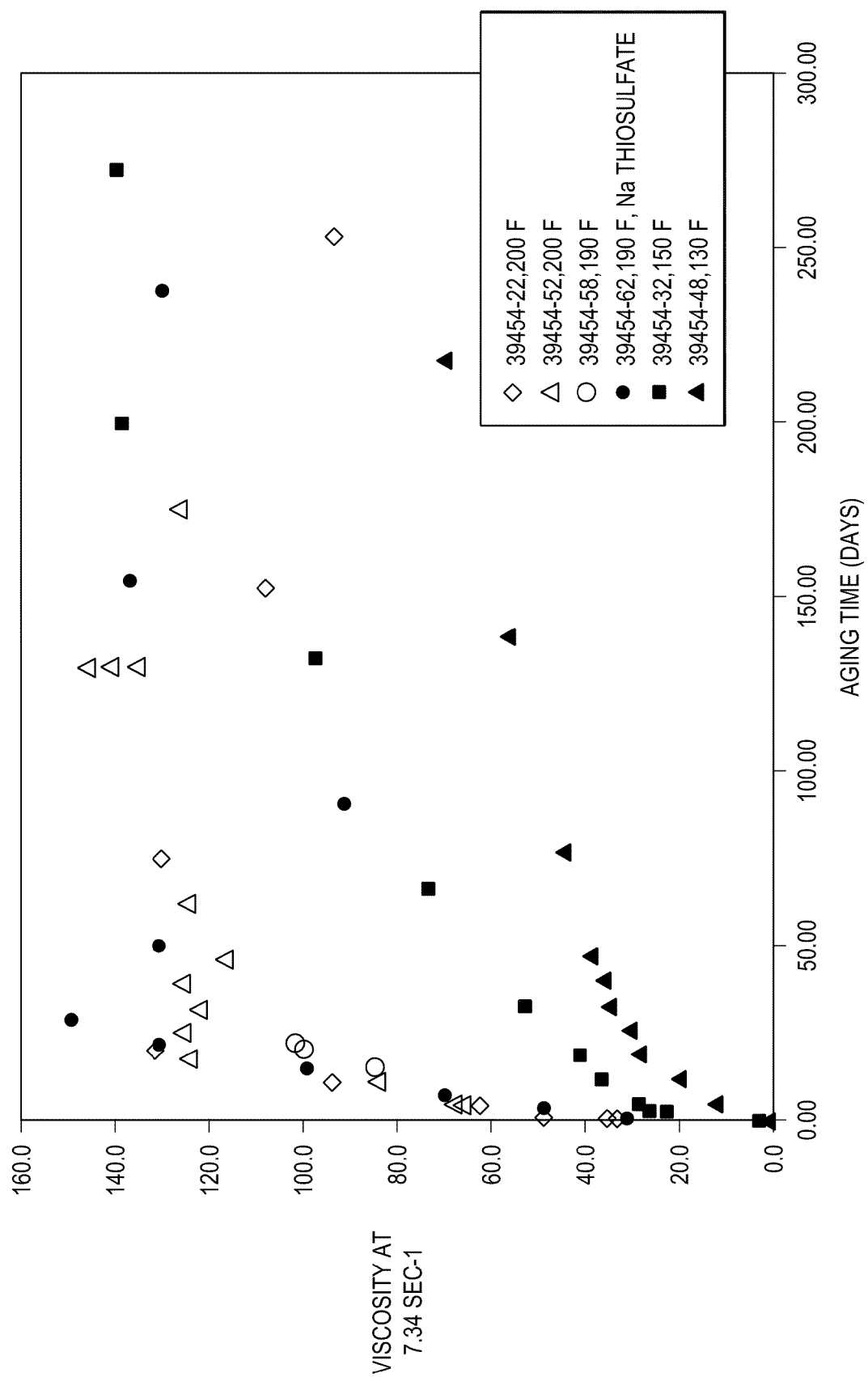
FIG. 2. Viscosity versus aging time for a solution of 1.0% BrightWater® EC 9368A Polymer aged at 130° F., 150° F., 190° F. and 200° F.

FIG. 2 shows a plot of viscosity versus aging time at various temperatures. As can be seen, the popping time is a strong function of aging temperature—that is the higher the temperature, the shorter the popping time. In order to determine the optimum aging condition, we accelerated aging of the polymer at 190° F. to shorten the popping time. After varying aging times at 190° F., the oven temperature was dropped to 150° F. and resistance factor was determined by injecting a small amount of water. At the same time the content of one ampoule was used to determine the viscosity and extent of polymer popping.

Figure 3:
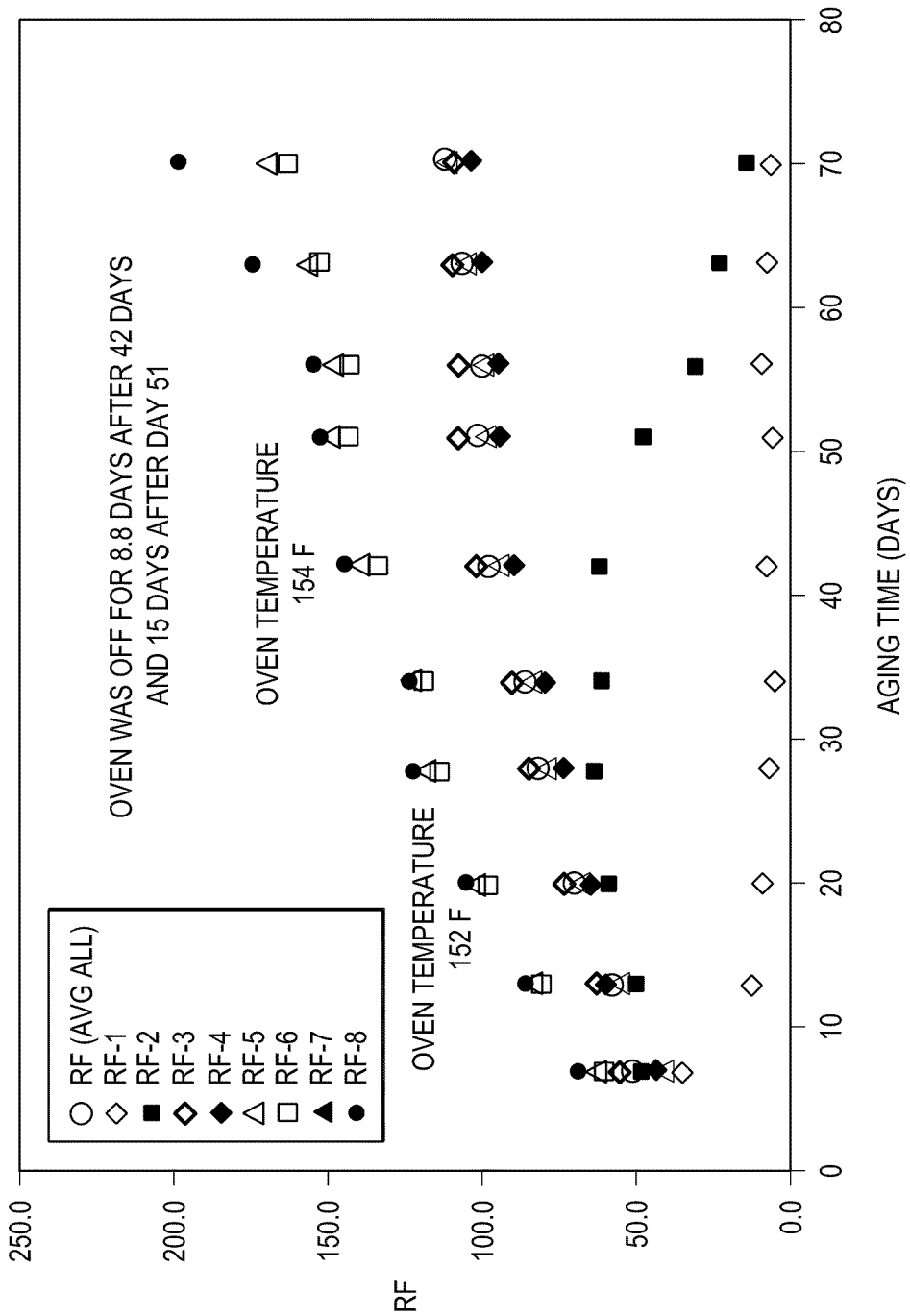
FIG. 3. RF versus aging time for Slim Tube #2 initially at 7.7 Darcy permeability treated with 1.0% BrightWater® EC 9368A in CPF-3 (Central Processing Facility-3 of the Kuparuk Participating Area of the Kuparuk River Unit) Produced Water aged at 190° F. and measured at 150° F.

Slim Tube #2 Test Results: 750 g of 1.0% BRIGHTWATER® EC 9368A was prepared in CPF-3 Produced Water before filling the polymer pump with 500 ml of this polymer. FIG. 3 shows a plot of Resistance Factor (RF) for each section of the tube as a function of aging time. $RF_2$ versus aging time indicated a graduate decline due to washing of the polymer to the next section. Furthermore, the RF values for sections 3-8 appeared to level off in about 70 days of aging at 190° F., which is in line with viscosity changes shown in FIG. 2.

Figure 4:
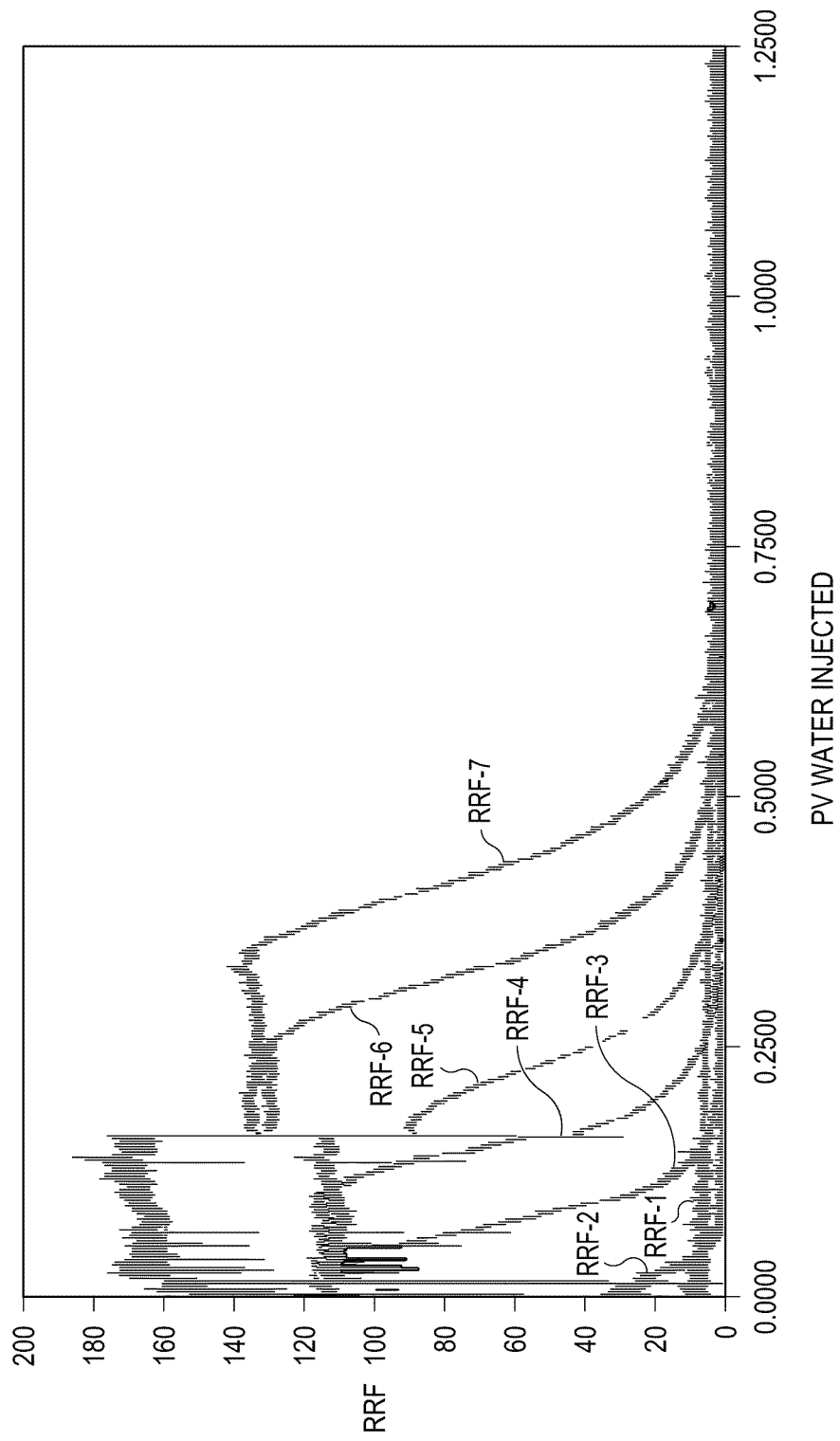
FIG. 4. RRF versus pore volume for water injection in Slim Tube #2 after popping of polymer.

At the conclusion of RF measurements, the tube was exposed to additional water injection to determine Residual Resistance Factor (RRF). FIG. 4 shows a plot of RRF values for sections 1-7 of the slim tube versus the pore volume of water injected. As this plot shows, the polymer appeared to washout gradually from each section with additional water injection. For example the polymer appeared to washout from section 1 first followed by section 2, 3, etc. Furthermore, RRF values in all sections dropped to about 1 in about 0.7 pore volume. These results indicated a short life for polymer treatment, which is undesirable.

Figure 6:
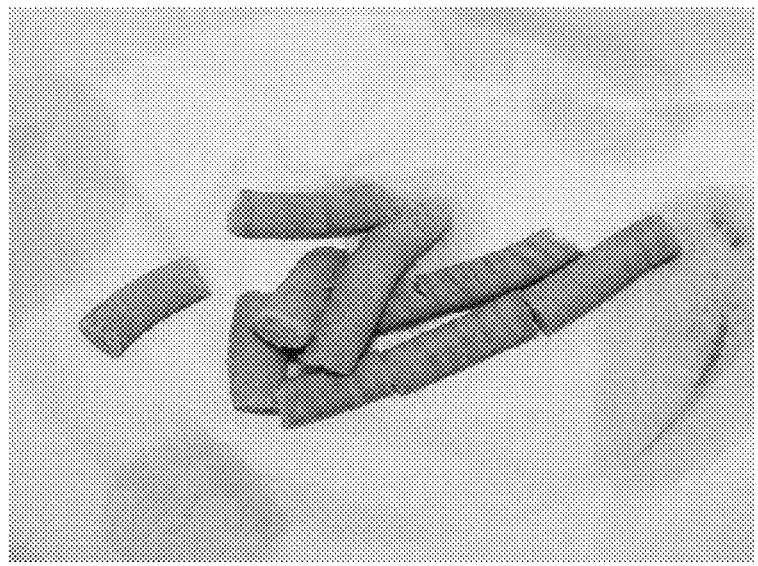
FIG. 6. Photo: Slim Tube 2 Treated with 0.29 PV of 1.0% EC 9368A Aged for 41 Days at 190° F. and 1000 ppm each of Phenol and Formaldehyde Aged for 11.2 Days at 190° F.
Figure 5:
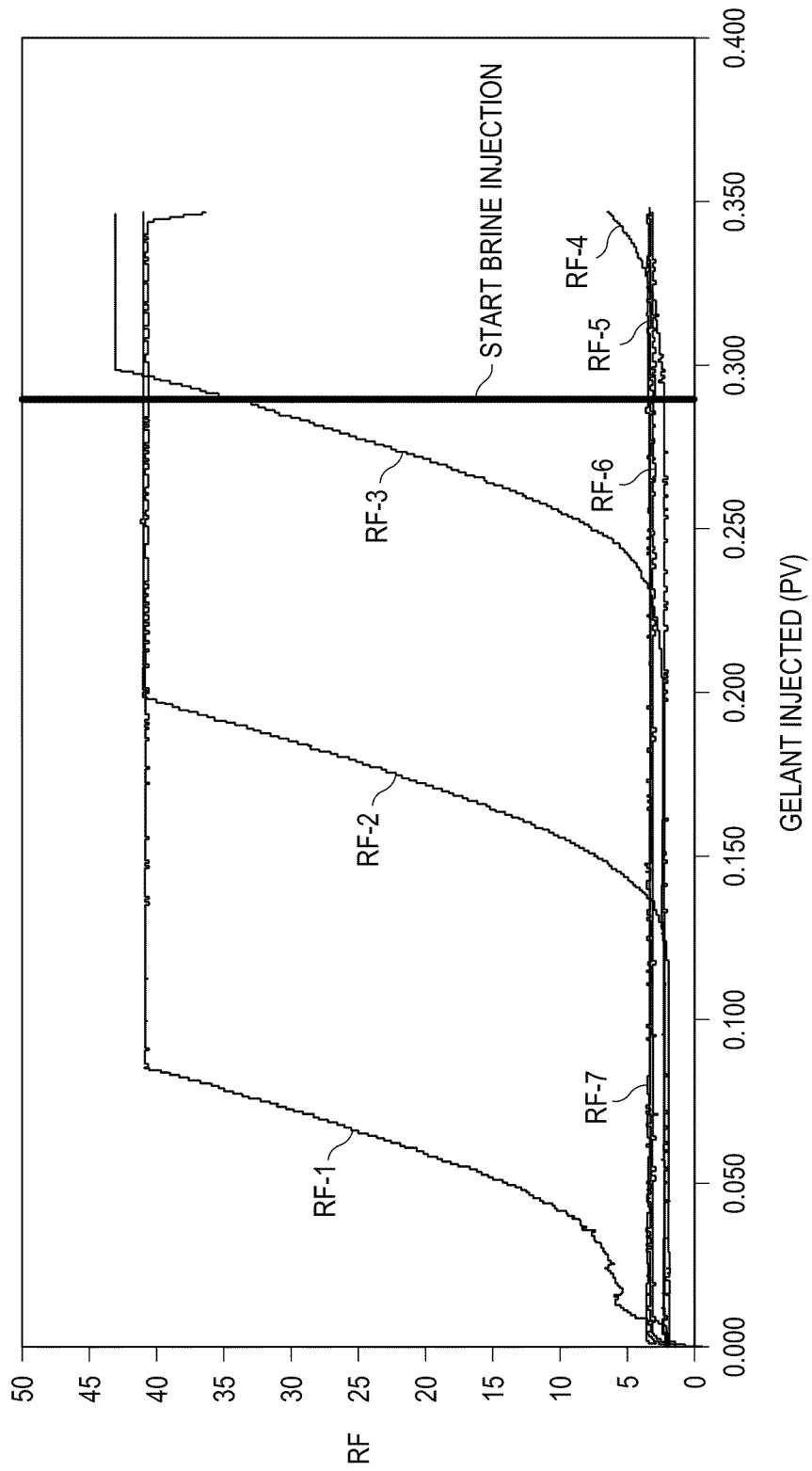
FIG. 5. RF versus pore volume for the injection of 0.29 PV 1.0% BrightWater® EC 9368A in CPF-3 Produced Water aged for 41 days at 190° F. before adding 1000 ppm each of phenol and formaldehyde and injecting the mixture in Slim Tube #2 at 98° F.

Gel Treatment of Slim Tube #2: To remedy the short longevity of the polymer treatment, Slim Tube #2 was treated with 0.29 PV of a gelling mixture produced from 1.0% BRIGHTWATER® EC 9368A aged for 41 days at 190° F. before adding 1000 ppm each of phenol and formaldehyde producing a gelant mixture. FIG. 5 shows the Resistance Factor versus gelant pore volume for this injection. Since only 0.29 PV of the gelant was injected in this test, which translated to about 11.6 linear feet of the Slim Tube #2, the RF values of section 1, 2 and 3 appear to level off to a value of about 41. In this figure the thick red vertical line represents the 0.29 PV of gelant injection. No significant RF values are observed for section 4-7. After sufficient time for gel formation Slim Tube #2 was exposed to water injection to determine RRF after gel treatment. No significant water flow was observed at reasonable pressures. FIG. 6 shows sand consolidation for section 3 of the slim tube from 10.00 to 11.25 feet.

Figure 7:
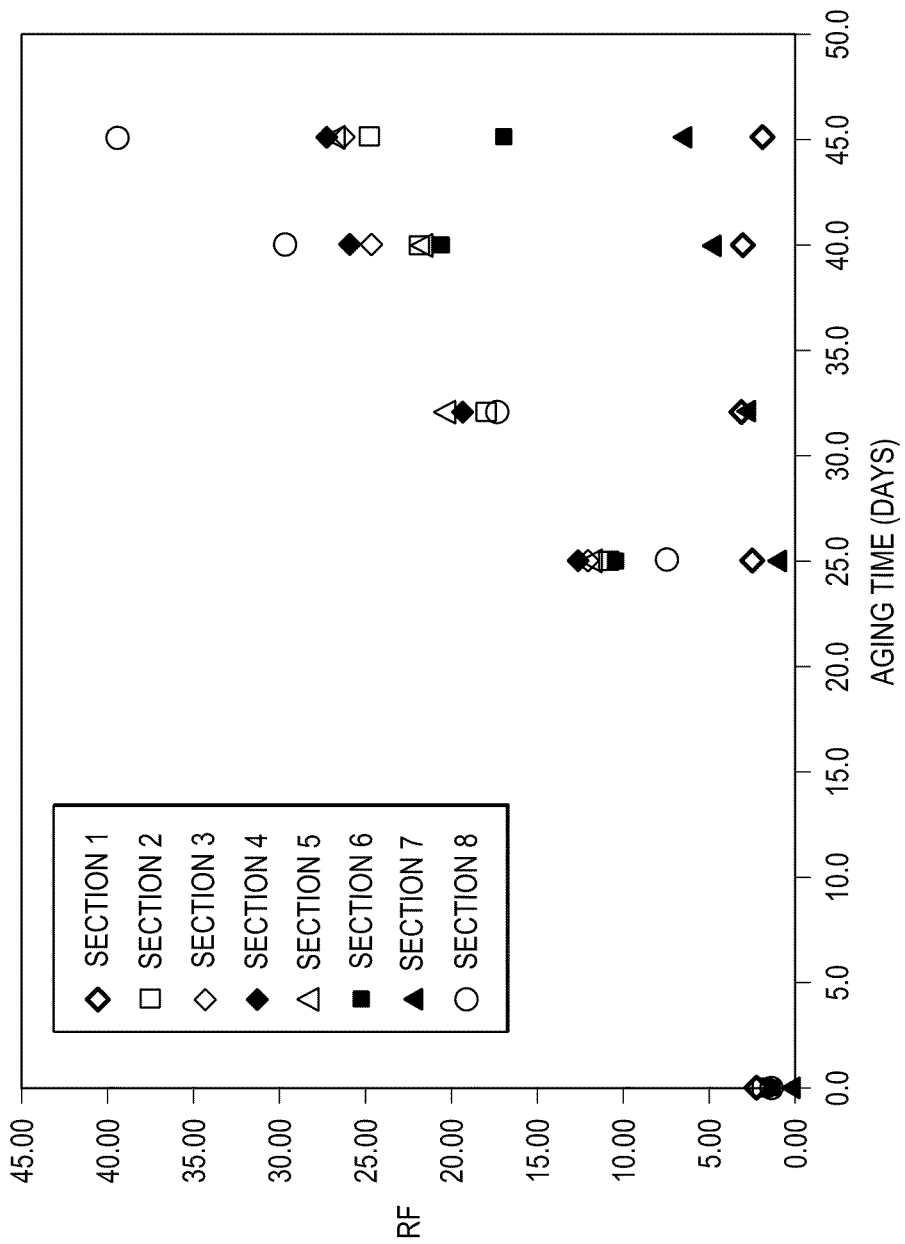
FIG. 7. RF versus aging time for Slim Tube #3 initially at 7.7 Darcy permeability treated with 0.5% BrightWater® EC 9368A in CPF-3 Produced Water aged at 190° F. and measured at 150° F.

Slim Tube #3 Test Results: Slim Tube #3 was similar to Slim Tube #2 with the polymer at 0.5% active. FIG. 7 shows a plot of RF versus pore volume for the injection of 0.5% fresh BRIGHTWATER® EC 9368A in Slim Tube #3 aged at 190° F. and measured at 150° F. This polymer was once again injectable with very low resistance factor. The resistance factors exhibited after aging for this tube was somewhat lower than those observed for Slim Tube #2 shown in FIG. 3. This behavior was due to the lower polymer concentration.

Figure 8:
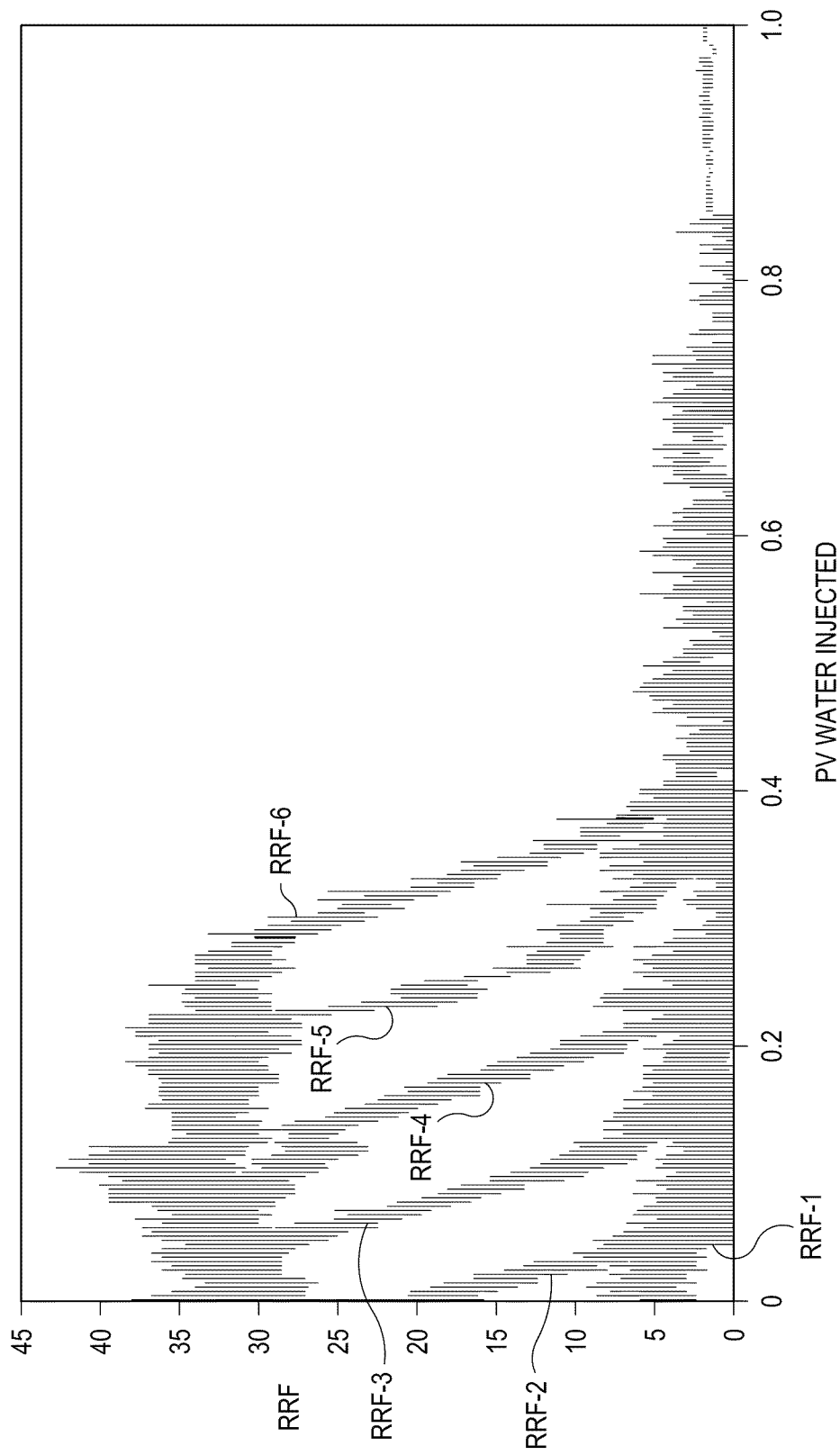
FIG. 8. Residual Resistance Factor versus pore volume following the injection of 0.5% BrightWater® EC 9368A Polymer in CPF-3 Produced Water in Slim Tube #3.

RRF values as demonstrated in FIG. 8 dropped within 1 PV of water injection. This behavior is similar to Slim Tube #2 which showed polymer washout.

Figure 9:
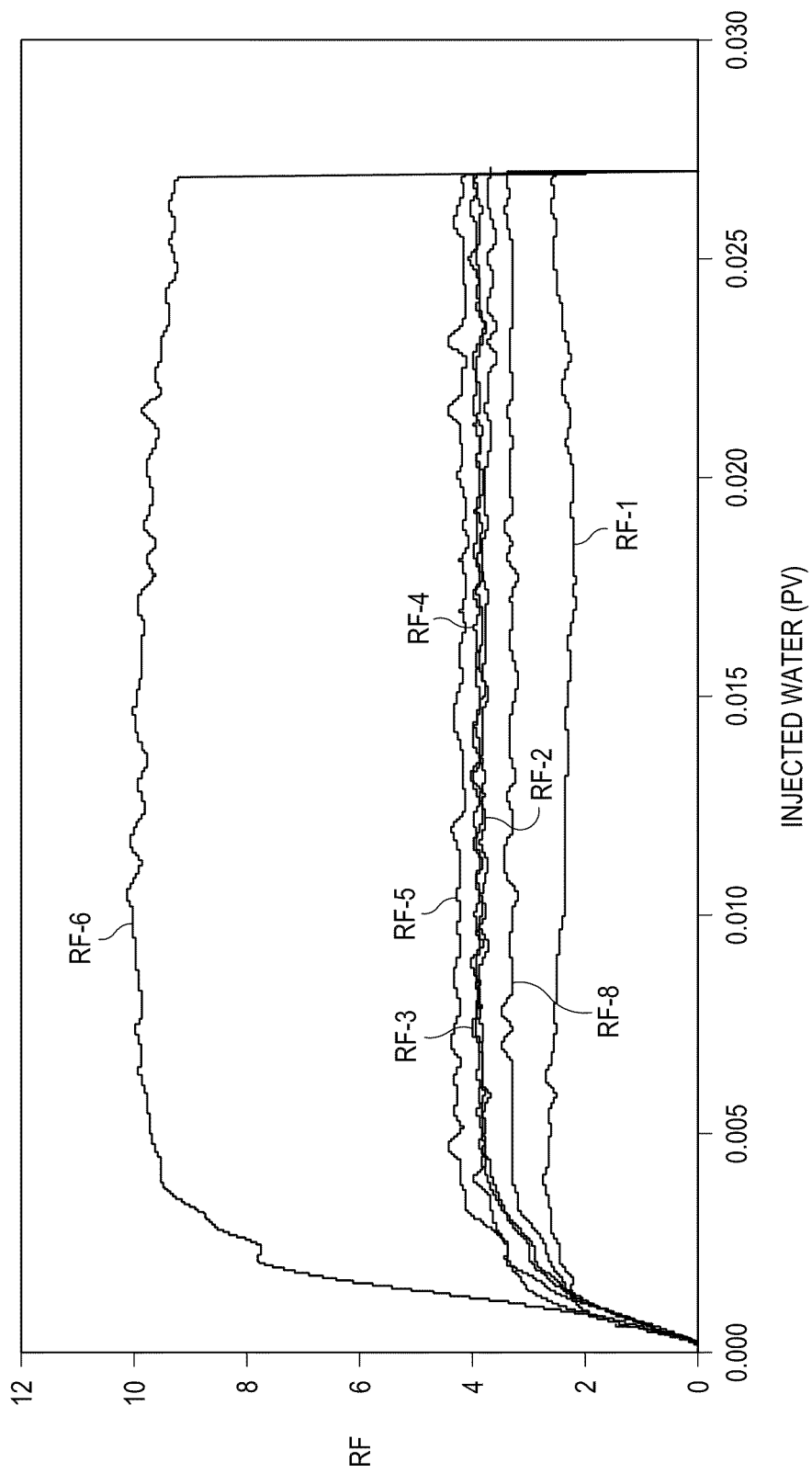
FIG. 9. RF versus pore volume for the injection of 0.5 PV gelant containing 0.5% fresh EC 9368A polymer and 1000 ppm each of phenol and formaldehyde in Slim Tube #3 following polymer washout.

Gel Treatment of Slim Tube #3: FIG. 9 shows a plot of RF versus PV for the injection of 0.5PV of a gelant mixture in Slim Tube #3 following washout of the polymer. This gelant mixture contained 0.5% fresh BRIGHTWATER® 9368A and 1000 ppm each of phenol and formaldehyde. As this plot shows the gelant was easily injected with low RF values. The polymer was allowed to pop and gel before RF values were measured. Water FIG. 10 shows a plot of RF values versus PV water injection exhibiting high RF value for sections 1-5 where gelant was present. At the end of water injection, the coil was dismantled and sections were cut to push the consolidated sand out of the tube (data not shown).

These experiments proved that the longevity of BRIGHT-WATER® polymer treatments could be significantly enhanced by addition of an external crosslinking system to the injection package. In these treatments, phenol-formaldehyde crosslinking system produced gels with the popped polymer exhibiting very large RF values. The resulting gels are not mobile and cannot be washed out of the slim tube. Such gels actually behaved as binding agents consolidating the sand.

Each of the following references are incorporated herein in their entirety.

U.S. Pat. No. 5,399,269
U.S. Pat. No. 5,480,933
U.S. Pat. No. 5,423,380
U.S. Pat. Nos. 6,454,003, 6,729,402 and 6,984,705
WO2007126318

What is claimed is:

1. A composition comprising expandable polymeric particles having labile crosslinkers and stable crosslinkers, said particle combined with a fluid and an unreacted tertiary crosslinker that is capable of further crosslinking the particle on degradation of the labile crosslinker so as to form a stable gel.

2. The composition of claim 1, wherein the tertiary crosslinker is selected from a combination of phenol, phenyl acetate, aspirin, furfuryl alcohol, salicyl alcohol, or resorcinol and formaldehyde or hexamethylenetetramine.

3. The composition of claim 1, wherein the tertiary crosslinker is phenol and formaldehyde.

4. The composition of claim 1 wherein expandable polymeric particles comprises polyacrylamide.

5. The composition of claim 1 wherein the expandable polymeric particles comprise a copolymer of acrylamide and sodium 2-acrylamido-2-methylpropane sulfonate.

6. The composition of claim 1, wherein the stable crosslinker is methylene bisacrylamide and the labile crosslinker is a diacrylate.

7. The composition of claim 1, wherein the expandable polymeric particles comprise a copolymer of acrylamide and sodium 2-acrylamido-2-methylpropane sulfonate, the stable crosslinker comprises methylene bisacrylamide, and the labile crosslinker comprises a polyethylene glycol diacrylate.

8. The composition of claim 1, wherein the expandable polymeric particles comprises a copolymer of acrylamide and sodium 2-acrylamido-2-methylpropane sulfonate, the stable crosslinker comprises methylene bisacrylamide, the labile crosslinker comprises a polyethylene glycol diacrylate, and the tertiary crosslinker is selected from a combination of phenol, phenyl acetate, aspirin, furfuryl alcohol, salicyl alcohol, or resorcinol and formaldehyde or hexamethylenetetramine.

9. The composition of claim 1, wherein the expandable polymeric particles comprises a copolymer of acrylamide and sodium 2-acrylamido-2-methylpropane sulfonate, the stable crosslinker comprises methylene bisacrylamide, the labile crosslinker comprises a polyethylene glycol diacrylate, and the tertiary crosslinker comprises phenol and formaldehyde.

10. A composition comprising highly cross linked expandable hydrophilic polymeric microparticles having an unexpanded volume average particle size diameter of from about 0.05 to about 10 microns and a cross linking agent content of from about 9,000 to about 200,000 ppm of labile crosslinkers and from 0 to about 300 ppm of stable cross linkers, combined with an unreacted tertiary crosslinker and a fluid comprising water.

11. The composition of claim 10, wherein the tertiary crosslinker is selected from a combination of phenol, phenyl acetate, aspirin, furfuryl alcohol, salicyl alcohol, or resorcinol and formaldehyde or hexamethylenetetramine.

12. The composition of claim 10, wherein the tertiary crosslinker is phenol and formaldehyde.

13. The composition of claim 10 wherein expandable polymeric microparticles comprise polyacrylamide.

14. The composition of claim 10 wherein the expandable polymeric microparticles comprise a copolymer of acrylamide and sodium 2-acrylamido-2-methylpropane sulfonate.

15. The composition of claim 10, wherein the stable crosslinker is methylene bisacrylamide and the labile crosslinker is a diacrylate.

16. The composition of claim 10, wherein the expandable polymeric microparticles comprise a copolymer of acrylamide and sodium 2-acrylamido-2-methylpropane sulfonate, the stable crosslinker comprises methylene bisacrylamide, and the labile crosslinker comprises a polyethylene glycol diacrylate.

17. The composition of claim 10, wherein the expandable polymeric microparticles comprise a copolymer of acrylamide and sodium 2-acrylamido-2-methylpropane sulfonate, the stable crosslinker comprises methylene bisacrylamide, the labile crosslinker comprises a polyethylene glycol diacrylate, and the tertiary crosslinker is selected from a combination of phenol, phenyl acetate, aspirin, furfuryl alcohol, salicyl alcohol, or resorcinol and formaldehyde or hexamethylenetetramine.

18. The composition of claim 10, wherein the expandable polymeric particles comprises a copolymer of acrylamide and sodium 2-acrylamido-2-methylpropane sulfonate, the stable crosslinker comprises methylene bisacrylamide, the labile crosslinker comprises a polyethylene glycol diacrylate, and the tertiary crosslinker comprises phenol and formaldehyde.

* * * * *